INVENTOR
N. J. Royce
ATTORNEYS

United States Patent Office 3,187,302
Patented June 1, 1965

3,187,302
CONTROL SYSTEMS FOR PARKING GARAGES
Norman James Royce, Richmond, England, assignor to Kins Developments, Ltd., a company of Great Britain
Filed Mar. 16, 1962, Ser. No. 180,177
21 Claims. (Cl. 340—51)

This invention relates to vehicle parking control systems, that is to say, control systems for directing the movement of vehicles in a parking area.

Parking areas, garages or sites, usually have a considerable number of bays or stalls (which may be merely marked on the floor) for the vehicles to be parked in, and the space available for the vehicles to manoeuvre as they leave their stalls is usually limited. In some cases, such as when the parking area is associated with a factory, many of the vehicles frequently wish to leave their stalls at the same time, and, if there was no means of controlling them a state of chaos would ensue.

The present invention has for its object the provision of an improved system of vehicle parking control.

According to the main feature of the invention, there is provided a vehicle parking control system, whereby movement of vehicles may be directed in a parking area including a plurality of vehicle stalls each giving onto a common access aisle, comprising indicating means individual to each stall energizable to indicate a release direction upon receipt of which a vehicle may be removed from a stall, control means operable to energize all said indicating means in the parking area, and a switch individual to each indicating means for preventing energization thereof, the energization preventing switch of a given stall being operable to an energization permitting condition in dependence upon operation of driver-operable means associated with said given stall and operation to an energization preventing condition of the energization preventing switch associated with predetermined stalls adjacent said given stall.

The nature of the invention and its subsidiary feature will become apparent from the following description of certain embodiments thereof, given by way of example only, taken in conjunction with the following drawings, in which.

Figures 1, 2:
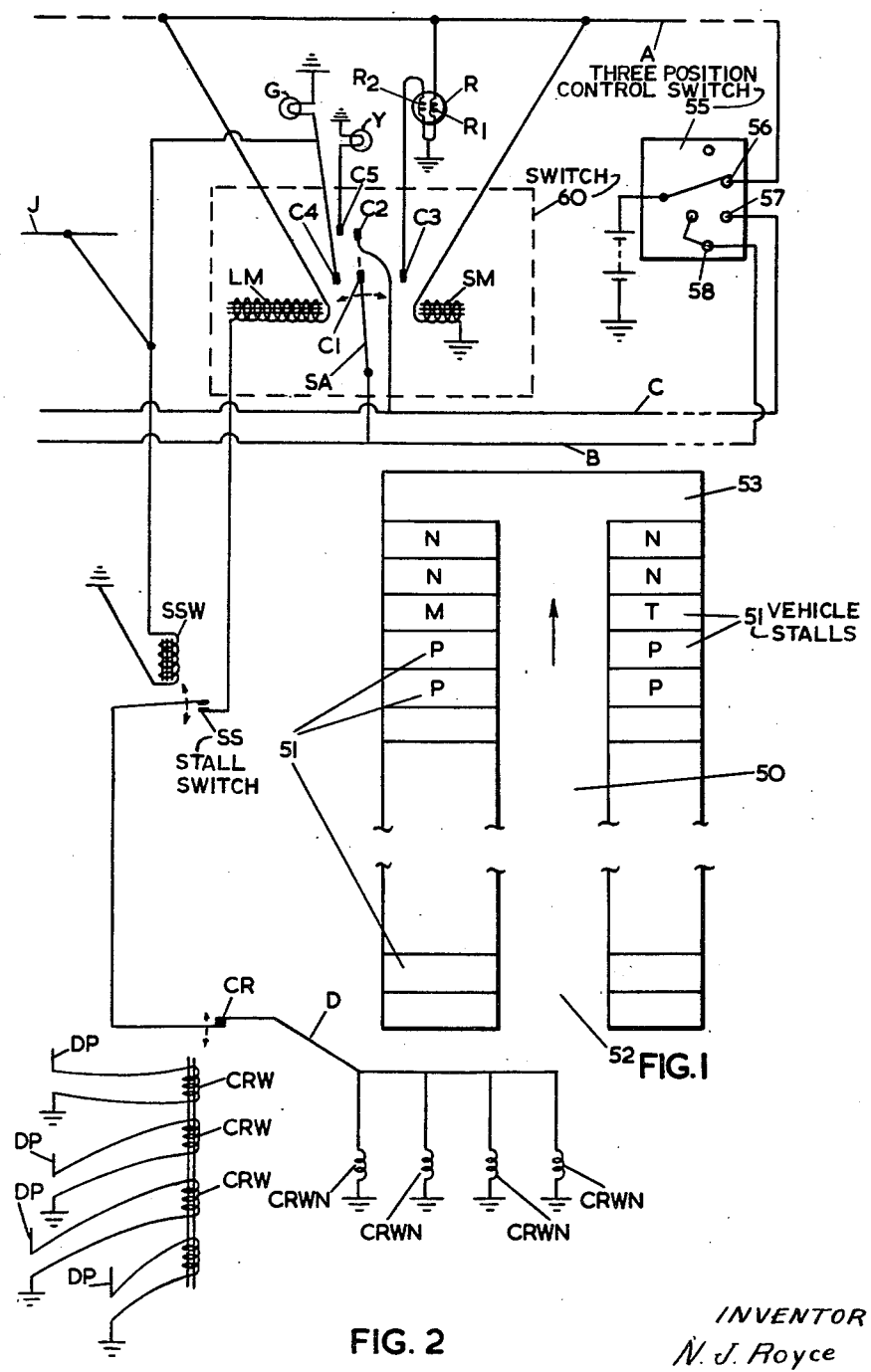
FIGURE 1 shows a diagram plan of one arrangement of parking area to which the invention relates.
FIGURE 2 is a circuit diagram of one form of control system according to the invention, as related to one stall only.

An example of the kind of parking area to which the invention may be applied is indicated in FIGURE 1 and may comprise a floor which is say, 500 feet long and 52 feet wide, having a central access aisle 50 extending longitudinally from an exit 52, with a plurality of vehicle stalls 51 on each side of the aisle, said stalls being arranged transversely to the aisle. The end space 53 is assumed to be left clear for manoeuvring vehicles from the end stalls.

Referring also to FIGURE 2, in the preferred arrangement each stall is fitted with three indicating means in the form of lamps, viz. a double filament red lamp R, a green lamp G and a yellow lamp Y, and is also fitted with driver operable means in the form of a stall switch SS which is adapted to be closed by the driver of the vehicle in that stall when he wishes to leave.

During rush hour periods, when congestion is to be expected, an attendant is on duty and he operates control means in the form of an electric switch 55 which has three positions, viz. a holding position 56 at which all stalls have their red lamps energized through a common conductor A, a warning position 57 at which all the stalls whose vehicles are next due to leave have their green and yellow lamps energized through common conductors B and C respectively, all the other stalls still having their red lamps energized (in a manner to be described hereinafter), and a release position 58 at which the yellow lamps of the said stalls whose vehicles are next due to leave are switched off leaving only their green lamps energized through the conductor B. During the holding period the batch of vehicles just previously released are leaving the aisle. During the warning period said vehicles have still not quite left the aisle, and during the release period the said vehicles have completely left the aisle and the vehicles next to be released leave their stalls and start manoeuvring.

In this preferred arrangement, the question of which vehicles are to receive warning during each warning period and are to be released during each release period is determined in the following way: When a driver enters a given stall (e.g. the stall marked M) he closes the stall switch of that stall. If he does this during the warning period or the release period said stall switch remains closed but nothing happens for the remainder of that period. If he closes said stall switch during the holding period, or when the holding period arrives with said stall switch already closed, circuit changes (to be described) normally take place in preparation for the energization of the green and yellow lamps of the stall during the subsequent warning period and for the de-energization of the yellow lamp during the subsequent release period, but the red lamp of that stall like all the others remains red during the holding period.

Such circuit changes do not, however, necessarily take place under the circumstances described, because, if every driver who had closed his stall switch was released when the next release period arrived, congestion might take place. The vehicles preferably leave their stalls backwards and turn into the aisle with their rear ends away from the exit in the direction of the arrow in FIGURE 1, and then move forwards along the aisle and out at the exit at the exit end of the aisle, and it is found that, in order for this manoeuvre to be effected properly, it is necessary that, for each vehicle released from a selected stall during any one release period, the vehicles in the next two stalls on both sides of the aisle in a direction from said selected stall away from said exit (i.e. those stalls marked N) must be held in their stalls.

It is therefore arranged that when the attendant changes from the holding period to the warning period only those stalls which fulfill certain conditions will have their green and yellow lamps energized and their red lamps de-energized. These conditions are: (a) that their own stall switches are closed, and (b) that, subject to overriding conditions to be described, they are not within two stalls distance in a direction away from the exit from another stall which has its stall switch closed.

In other words, during each holding period, a competition is, so to speak, taking place between all those drivers having their stall switches closed, with preference given to the drivers nearest the exit. If, for example a driver closes the stall switch of stall M during a holding period and no other stall switch is closed in either of the two nearest stalls in the direction of the exit from the stall M (i.e. the stalls marked P), the aforesaid circuit changes for the stall M will take place. If, subsequently, during the same holding period, a second driver closes a stall switch of one of the stalls P the aforesaid circuit changes for that stall P will take place and those for the stall M will be cancelled. If, however, during the same holding period, a third driver has his stall switch closed within one of the two nearest stalls in the direction of the exit from said stall P, the circuit changes for the third driver's stall will take place and those for said stall P will be prevented or cancelled, and this prevention or cancellation of the circuit changes for said stall P will permit or restore the circuit changes for the stall M, always assuming that the third driver's stall is not one of the two nearest stalls in the direction of the exit from the stall M. Again, the circuit changes for the third driver's stall are subject to a fourth driver, in either of the two stalls nearest said third driver's stall which are positioned between said third driver's stall and the exit, not, during the same holding period, having his stall switch closed, and so on.

It is assumed that the stall (marked T) opposite stall M is interconnected with the stalls P and N in the same way as stall M. Alternative arrangement for stall T is discussed hereinafter.

Preferably, each stall switch when closed remains closed until the green lamp of that stall is energized and thus each driver, having closed his stall switch, has nothing to do but remain in his vehicle until the green lamp of his stall is energized.

It will be apparent that the invention is not limited to an arrangement in which the circuitry for each stall is interconnected with that of the stalls situated two stalls distance therefrom. The particular interconnections will depend, for example, on the dimensions of the vehicle stalls and the type of vehicle being accommodated. However, for ease of description, reference will hereinafter be made to the arrangement above described.

Referring to FIGURE 2, this illustrates the circuitry for one stall (e.g. the stall M). The conductors B and C are connected to the respective lamps G and Y through contacts of what will be termed an intercepting switch 60 operated by a large electromagnet LM and a small electro-magnet SM. These act in opposition on a switch armature SA which carries a switch contact C1 in conductive relationship with conductor B and also a switch contact C2 in conductive relationship with conductor C. When the small magnet SM alone is energized, the armature SA moves the contact C1 into a release-signal intercepting condition in which it is in engagement with a contact C3 connected to earth through the filament R2 of the lamp R, the contact C2 remaining unconnected. The filament R1 is connected directly to conductor A. When both the large and the small switch magnets are energized, the armature SA moves the contact C1 into a non-intercepting condition in which it is in engagement with a contact C4 connected to the lamp G and the contact C2 is in engagement with a contact C5 connected to the lamp Y. When neither of the switch magnets is energized the armature SA remains in its last-operated condition.

The small magnet SM is energized directly through conductor A. Energization of magnet LM, to operate the switch 60 to a condition in which the release signal is not intercepted, is effected by completion of a control circuit including the magnet coil, the contacts of the stall switch SS, and the contacts of a communicating relay CR having a number of actuating coils CRW. One end of this control circuit is connected to the conductor A and the other end, constituted by a conductor D goes to earth through one of the coils CRWN of each of the similar communicating relays of the stalls N, said coils CRWN being connected in parallel.

The coils CRW are each in circuit with a different one of the conductors DP (and thus the associated relay contacts) of the communicating relays of the two stalls P on each side of the aisle from the stall M towards the exit. It is to be understood that, for any given stall, the pattern of relay interconnection is the same as described for stall M in so far as corresponding stalls N and P exist. Thus, the stall nearest the exit does not have any corresponding stalls P and, in fact, need not be provided with a communicating relay.

The operation of the system will now be described, with reference to stall M. During the holding period, when the conductor A is energized, the red lamp R is energized through its filament R1 and the small magnet SM is also energized. Therefore if the stall switch SS is open and the large magnet LM therefore de-energized, the contact C1 will be in engagement with the contact C3. If the stall switch SS remains open, until the warning period commences by de-energization of conductor A and energization of conductors B and C, the armature SA will stay where it is. Thus, the other filament R2 of the red lamp R will remain energized through conductor B and contacts C1, C3, and will continue energized during the release period during which conductor B is still energized. It will be noted moreover that closure of the stall switch SS during the warning or release period will be without effect, as conductor A is de-energized.

If, however, during the holding period the stall switch SS is closed, whether the act of closure is effected during that period or was effected during any preceding period, the large magnet LM will, assuming the communicating relay CR is closed, be energized and the contact C1 will be in engagement with the contact C4, and the contact C2 in engagement with C5. This, for the moment will be without effect as the conductor B is de-energized, but, assuming the communicating relay CR remains closed, the lamps G and Y will both be energized when the change to the warning period is made, the former through the contacts C1, C4, and the latter through the contacts C2, C5. Also the filament R1 of the red lamp R will be de-energized by de-energization of conductor A and the other filament R2 will not be energized as C3 is disconnected from C1. The red lamp will therefore go out.

In order to reset the stall switch SS to its open condition when lamps G and Y are energized, the coil SSW of a switch actuating electro-magnet is connected to the green lamp, said coil also being energized through contacts C1 and C4. It will be noted that once the holding period is terminated, and until the next holding period commences, the armature SA must stay put, as both the small winding SM and the large winding LM must be de-energized, since the conductor A is de-energized.

The green and yellow stall lamps are thus illuminated and the driver prepares to leave his stall, and he does so when the release period commences and the conductor C and therefore the yellow lamp Y are de-energized.

If, however, at any time during the holding period, the stall switch of any of the stalls P is closed, one of the windings CRW will be energized and the communicating relay CR will accordingly open, thereby de-energizing the large magnet LM, and this will cause the armature SA to move under the influence of the small magnet SM to the original position with the contact C1 in engagement with the contact C3. In other words, the order given by the closure of the stall switch SS is intercepted, and, when the warning and release periods arrive, the filament R2 of the red lamp will be energized.

It will be noted, however, that the stall switch SS remains closed, and therefore during the next holding period, the aforesaid stall switch of the stall P having been re-opened during the intervening warning period, and the communicating relay CR having therefore been reclosed, the large magnet LM will again be energized and the contacts C1, C4 and C2, C5 will be made. Assuming there is no other intervention by the closure of an inhibiting stall switch associated with a stall positioned between said stall P and the area exit, the yellow and green lamps Y and G will be energized and the red lamp de-energized during the next warning period, and the green lamp only during the next release period, and the driver will therefore be free to leave his stall.

It will, of course, have been observed that the closure of any stall switch does not have any opening effect on the communicating relays of stalls on the side thereof away from the exit from the area therefrom if the communicating relay associated with such stall switch has itself been opened.

When the control system is initially energized, some stall switches may be open and some closed. For ensuring that all switches are initially set in the open condition, all the electro-magnet coils SSW are momentarily energized through a common conductor which leads, through connections not shown, to the control switch 55.

The arrangement described can obviously be modified as required. For instance it may be found inconvenient for two directly opposite stalls (e.g. M and T) to receive the release signal at the same time. The arrangement may therefore be such that, when the stall switches of stalls M and T are both closed during a holding period, the one on one side takes precedence over the one on the other side. The arrangement is accordingly such that the stall switch of stall M can open the communicating relays not only of the four stalls N but also of the stall T, whereas the stall switch of stall T can open the communicating relays of only the four stalls N.

The arrangement described may be modified in that the stall switch, instead of being closed by the driver may be closed by the vehicle being moved over a pad in the stall, say by moving in the direction of the door.

Although the invention has been described with reference to an embodiment comprising red, green and yellow indicating lamps, it will be appreciated that a system including only a green lamp in each stall may be quite adequate in certain circumstances. Thus, the invention envisages a simplified system in which only a release signal is given and vehicles remain stationary at other times. Thus, the switch 60 would be a simple make-and-break switch with contacts corresponding to the contacts C1 and C4, serving to intercept a release signal when its control circuit is opened.

Figure 3:
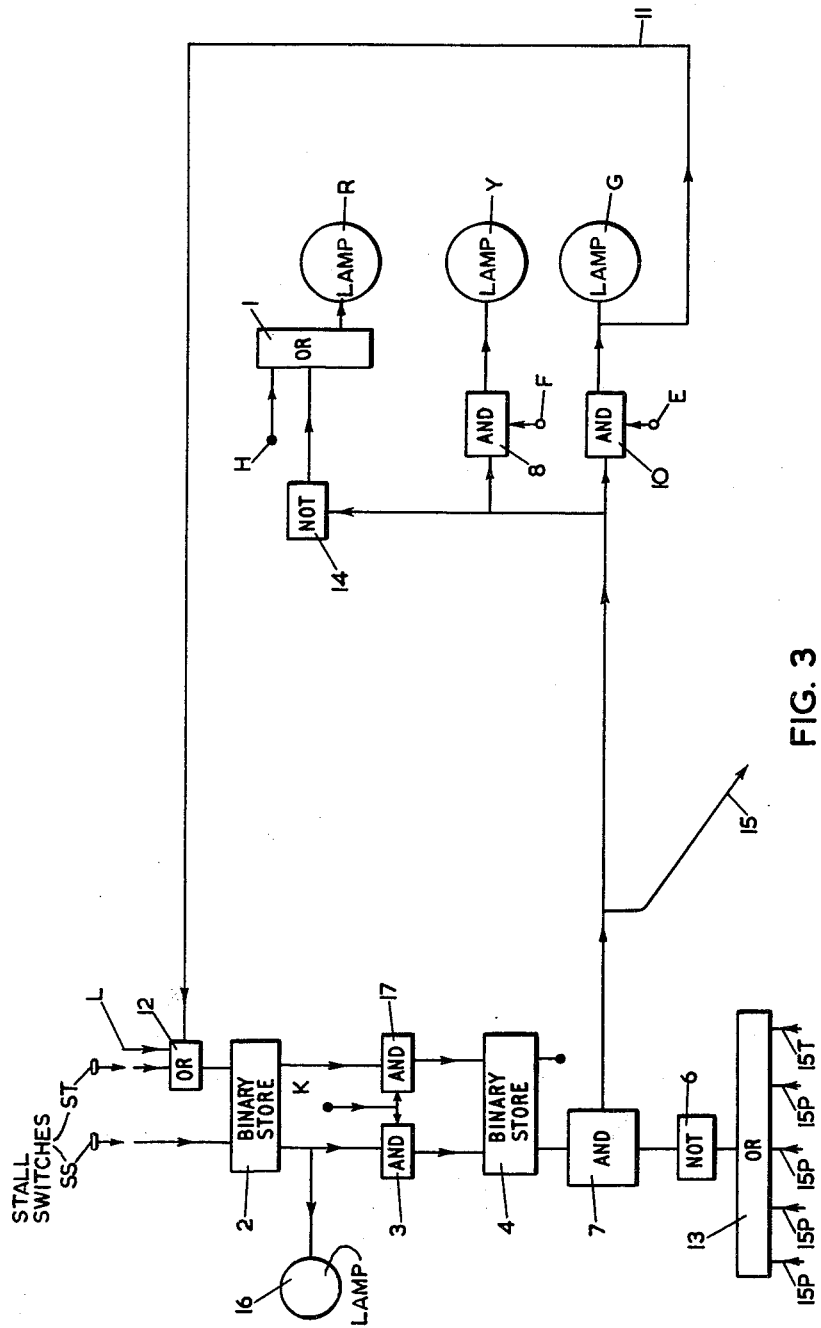
FIGURE 3 is a circuit diagram of an alternative form of the stall circuit shown in FIGURE 1.

Referring now to FIGURE 3, this illustrates alternative circuitry by which a similar (and slightly more elaborate) control can be obtained. This embodiment employs logic units, such as those consisting of semiconductor valves as saturable reactor elements. Such units are well known, per se and will not themselves be detailed herein. In the following description, the term "OR" unit means a logic unit which produces an output signal only in the presence of one of a plurality of input signals; the term "binary store" means a logic unit comprising one or more bi-stable devices; the term "AND" unit means a logic unit which produces an output signal only in the presence of all of a plurality of input signals; and the term "NOT" unit means a logic unit which produces an output signal only in the absence of an input signal.

As in the case of FIGURE 2, FIGURE 3 illustrates the circuitry for one stall. As before, the references R, G and Y designate respectively the red, green and yellow lamps of the stall (the red lamp now having only one filament) and the reference SS designates the stall switch. The references E, F, H and K designate terminal points which are common to all the stalls, and which the attendant can energize and de-energize at will. The lamp G is energized from the common terminal E through an AND unit 10 and lamp Y is energized from the common terminal F through an AND unit 8. Lamp R is energized through an OR unit 1, either by energization of the common terminal H or by the output of a NOT unit 14. These three units 8, 10 and 14, together with the OR unit 1, correspond in combination to the switch 60 of FIGURE 2 and said three units have a common input control circuit which corresponds to the control circuit of FIGURE 2. This control circuit includes in succession the stall switch SS, two binary stores 2 and 4 separated by an AND unit 3 having a second input from terminal K, and an AND unit 7. The switch SS is operable to connect a source of voltages (not shown) to the binary store 2.

Interconnection with the stalls N further from the exit is provided through a conductor 15 leading from the output of AND unit 7 and corresponding to conductor D of FIGURE 2. The AND unit 7 has a second input connected, through a NOT unit 6 and an OR unit 13, to the conductor 15 of each stall P and the latter are indicated as inputs 15P to the OR unit 13. Also, it is here assumed that the stall M under consideration is to give way to the opposite stall T. Therefore, the OR unit 13 has a further input 15T from the conductor 15 of stall T. Although not shown in FIGURE 3, it will be understood from the foregoing explanation that the conductor 15 (of stall M) is connected as one of the inputs to each of the OR units of stalls N.

During the holding period, the terminal point H is energized and the red lamp R is energized through the OR unit 1. Assuming that during this holding period or some previous period, the driver has momentarily closed his stall switch SS (which in the present instance takes the form of a normally-open push button switch), the driver's wish to leave his stall is registered by the binary store 2. A little before the warning period the attendant energizes the terminal point K for a short time, say 1/10 of a second, and this, through the AND unit 3 causes a copy of the contents of said binary store 2 to be transferred to the second binary store 4, the latter being isolated again when the terminal point K is de-energized. After a further, say 1/10 of a second, during which the circuit settles down, the attendant energizes the terminal point F, thereby changing to the warning period. If during the said holding period there has been no interception, owing to the momentary closure of another stall switch, the conductors 15P and 15T will all be de-energized and, owing to the NOT unit 6, energization is transmitted from the binary store 4 through the AND unit 7, and, owing to the energization of the point F, through the AND unit 8 to the yellow lamp Y. The red lamp remains energized by point H through the OR unit 1. Thus the red and yellow lamps are energized and the driver thereby receives warning that he is about to receive the release signal.

To initiate the release period the attendant now energizes the point E and de-energizes the points F and H. Consequently, the green lamp G is energized through the AND unit 10 and the yellow lamp Y is de-energized owing to the AND unit 8, and the red lamp R is de-energized since H is de-energized while the NOT unit 14 prevents energization from the AND unit 7.

When the green lamp G is energized the binary store 2 is energized through a conductor 11 and an OR unit 12 so as to cancel the driver's wish recorded in said binary store 2. Thus, when next the point K is energized, the image of the driver's wish in the second binary store 4 will also be cancelled, due to energization of an AND unit 17.

At the appropriate moment, the release period is changed to a second warning period at which indication is given that the next holding period is about to commence. This is a refinement which was not provided for in the embodiment of FIGURE 2. To initiate this second warning period the attendant energizes point F and de-energizes point E. The yellow lamp Y is thus energized through the AND unit 8 and the green lamp G is de-energized owing to blocking by the AND unit 10.

Next the attendant again initiates the holding period by de-energizing the point F and energizing the point H.

If, when the first warning period was initiated by the energization of the point F, any one or more of the conductors 15P or 15T had been energized, the OR unit 13 and the NOT unit 6 would have co-operated to prevent completion of the control circuit through the AND unit 7, and therefore the AND unit 8 would have blocked energization of the yellow lamp Y. Owing, however, to the NOT unit 14, the red lamp R would have been energized through the OR unit 1, even though the point H is de-energized. In like manner, on subsequently changing to the release period, the green lamp G would not have been energized and upon changing to the second warning period the yellow lamp Y would not have been energized. The red lamp R would have been energized all the time. Also, as the green lamp would not have been energized the driver's wish, recorded in the binary store 2 would not have been cancelled through the conductor 11.

It will be noted that the conductor 15 cannot be energized until immediately before the change to the first warning period and cannot even then be energized if any of the conductors 15P or 15T becomes energized at the same time. It will thus be seen that the system functions essentially in the same way as in FIGURE 2. When the driver operates his stall switch (stall M) a request for him to leave the stall is registered, and if, at the commencement of the next first warning period, a similar request has not been registered by one of the drivers closer to the exit who have power to inhibit him (stalls P), he will get, first the warning signal for departure and then, during the following release period, the release signal. If however, before the commencement of said first warning period, one of said inhibiting drivers closer to the exit has actuated his stall switch thereby registering a request for him to leave his stall, the driver of stall M will, unless of course said inhibiting driver is himself inhibited by a further driver even closer to the exit, get only the holding signal until the commencement of the next first warning period when he will get the warning signal for departure followed by the release signal, if by that time there is no inhibition registered by an inhibiting driver closer to the exit.

In this embodiment, the driver having registered his wish to depart by momentarily closing his stall switch SS, he can cancel such registration by momentarily closing another switch ST in the stall, thus operating the OR unit 12 in like manner to a signal passed along the conductor 11.

As in the FIGURE 2 embodiment, it is desirable that all the stall control circuits should be in a non-energized condition when the system is first energized. Thus, each OR unit 12 is energizable from a terminal L common to all the stalls and the attendant initially energizes this terminal in the same manner as conductor J of FIGURE 2, thereby setting the binary stores 2.

Preferably, and as shown, a further lamp 16 is connected to the circuit between binary store 2 and the AND unit 3, which lamp may be located adjacent the associated stall switch SS. When the binary store is energized, the lamp 16 is energized to show that the driver's wish to leave is registered.

The invention also contemplates making the parking control system fully automatic by providing means whereby the function exercized by the attendant, in the embodiments above described, is exercized automatically. This involves providing an automatic way of observing that the aisle is clear, so that the holding period can be terminated and the next warning period, followed by the next release period, can be initiated. This may be effected by judiciously placing photo-electric cells in the aisle so that if none of their beams is interrupted it is known that the aisle is clear. Alternatively photo-electric cells may be placed in the stalls so that at any instant the number of empty stalls in the parking area is known, and a device may be provided which counts the vehicles as they leave the parking area. By comparing the two counts it would be possible to know when the aisle was empty.

The controls heretofore discussed have been for vehicles leaving the parking area. For controlling the vehicles entering the parking area, time is divided into flow time and manoeuvre time. During flow time, a stream of vehicles is allowed to enter the aisle and no one is allowed to park until the head of the stream has reached the end of the aisle remote from the entrance. At that point manoeuvre time commences and all the vehicles in the aisle can park simultaneously. All that would be required to implement this is a number of lights connected together which are visible from the aisle and under the control of the parking attendant. When set to red, no one may manoeuvre into a stall, and when set to green manoeuvring is permissible.

It will be appreciated that the present invention is capable of modification to meet the requirements of a particular installation while remaining within the scope, of at least some, of the appended claims. In particular, it may be desirable to apply the control system to only part of a vehicle park and thus the term "parking area" is to be construed as an area of a vehicle park to which the invention is applied.

I claim:
1. A vehicle parking control system for controlling the movement of vehicles in a parking area provided with a power source and comprising a plurality of vehicle stalls together with a common access aisle into which each of said stalls opens, said system comprising release indicating means associated with each stall which, when energized, indicates that a vehicle may leave that stall, common control means for connecting and disconnecting said indicating means to said power source as a group, individual selector means for connecting and disconnecting each of said indicating means with said power source through said control means, individual driver-operable operating means and additional operating means associated with and connected to operate each selector means, each operating means having both an operative and an inoperative position, and said operating means being connected to operate the associated selector means to connect an indicating means to said power source only when both operating means associated with that selector means are in their operative positions, the additional operating means for a given stall being linked to the operating means of at least one nearby stall for movement to its inoperative position whenever the operating means of said nearby stall are brought into their operative positions.

2. A system as claimed in claim 1, comprising means for inhibiting operation to its operative position of the additional operating means associated with further stalls nearby said given stall when the operating means associated with said given stall are moved to their operative position.

3. A system according to claim 2, in which each stall is defined by two ends, through one of which it opens into said aisle, and by sides joining said ends, said at least one nearby stall lying to one side of said given stall, said further nearby stalls lying to the other side of said given stall, and said first-mentioned nearby stalls being situated on both sides of said access aisle.

4. A system as claimed in claim 3 in which the additional operating means of sad given stall is linked to the operating means of nearby stalls situated on both sides of said access aisle for movement to its inoperative position whenever either of the operating means to which it is linked is moved to its operating position.

5. A system as claimed in claim 1 comprising additional indicating means individual to each stall for indicating a holding signal upon receipt of which a vehicle may not be removed from a stall, said additional indicating means being connected to be energized through said common control means independently of said individual selector means when said common control means is in one position, and to be energized through both said common control means and said selector means when said common control means is in another position and said selector means is in a position disconnecting said first mentioned indicating means.

6. A system as claimed in claim 1 in which said common control means has three operating positions and said selector switch two, and comprising holding indicating means, which indicates that a vehicle should not leave its stall and warning indicating means which indicates that the release indicating means will be energized shortly, said holding indicating means being connected to be energized when said common control means is in its first position, regardless of the position of said selector switch, and to be energized when said common control means is in its third position while said selector switch is in its first position, said warning indicating means being connected to be energized when both said common control means and said selector switch are in their second positions, and said release indicating means being connected to be energized when said common control means is in its third position and said selector switch in its second position.

7. A system according to claim 4, wherein the stall immediately opposite said given stall is one of said nearby stalls.

8. A system according to claim 1, wherein said common control means is manually operable.

9. A system according to claim 1, wherein said common control means is automatically operable in response to vehicle movement within said parking area.

10. A system according to claim, comprising automatic means for operating said common control means, said automatic means including sensing means for detecting the absence of vehicles from said common access aisle.

11. A system according to claim 1, wherein said selector means comprises an electric switch connected between said common control means and said electrically energizable indicating means for indicating said release signal.

12. A system according to claim 11, wherein the two operating means for each stall comprise electric switches connected in an individual control circuit for each selector means.

13. A system according to claim 12, wherein each of said additional operating means comprises an electric-magnetic relay having an actuating solenoid in circuit with the operating means associated with said at least one nearby stall, whereby completion of the individual control circuit of said nearby stall causes the contacts of said relay to open and prevent completion of the individual control circuit associated with said given stall.

14. A system according to claim 13, comprising further nearby stalls, each equpped with control means, selector means, driver operable operating means, and additional operating means comprising an electromagnetic relay connected to each other in the same manner as those of said given stall and in which the individual control circuit associated with said given stall includes the actuating solenoid of the relay associated with each of said further nearby stalls, whereby completion of the individual control circuit associated with said given stall prevents completion of the individual control circuits associated with each of said further nearby stalls.

15. A system according to claim 1, comprising additional indicating means individual to each stall and energizable through said common control means to indicate a holding signal upon receipt of which a vehicle may not be removed from a stall, further indicating means individual to each stall and energizable through said common control means to indicate a warning signal prior to receipt of a release signal, and in which said selector means comprises an electric switch which has a moving contact movable between a first contact position, in which it connects control means to both said first-mentioned and said further indicating means, and a second contact position in which it connects said control means to said additional indicating means.

16. A system according to claim 1, wherein said selector means is a logic unit, said individual control circuit and sad common control means being connected in separate input circuits of said unit, said unit producing an output signal to energize the first-mentioned indicating means when both said input circuits are energized.

17. A system according to claim 16, in which the driver operable operating means and the additional operating means for each stall are connected in an individual control circuit for the indicating means for that stall and said additional operating means is a logic unit having its output circuit and one input circuit connected in said individual control circuit, and having a further input circuit connected in circuit with the individual control circuits associated with the first-mentioned predetermined stalls, whereby completion of any of the latter individual control circuits prevents completion of the individual control circuit associated with said given stall.

18. A system according to claim 17, wherein each logic unit is an "AND" logic unit.

19. A system according to claim 18, in which each driver operable operating means comprises a switch and each individual control circuit includes a "BINARY STORE" logic unit supplied with an energizing signal on closure of said driver-operable switch, said "BINARY STORE" logic unit being in circuit with one input circuit of the "AND" logic unit constituting said selector means.

20. A system according to claim 1 comprising means for cancelling operation of said driver-operable operating means upon energization of said indicating means.

21. A system according to claims 19 comprising means for cancelling operation of said driver operable operating means upon energization of said indicating means and further driver-operable operating means consisting of a switch individual to each stall operable to cancel energization of said "BINARY STORE" logic unit.

References Cited by the Examiner

UNITED STATES PATENTS

| | | | |
|---|---|---|---|
| 2,601,370 | 6/52 | Cooper et al. | 340—51 |
| 2,632,156 | 3/53 | Reynolds | 340—51 |
| 2,733,426 | 1/56 | Jablonowski | 340—51 |

NEIL C. READ, *Primary Examiner.*

THOMAS B. HABECKER, *Examiner.*